United States Patent [19]
Jolly et al.

[11] Patent Number: 5,947,238
[45] Date of Patent: Sep. 7, 1999

[54] PASSIVE MAGNETORHEOLOGICAL FLUID DEVICE WITH EXCURSION DEPENDENT CHARACTERISTIC

[75] Inventors: Mark R. Jolly, Holly Springs; Michael J. Chrzan, Apex, both of N.C.

[73] Assignee: Lord Corporation, Cary, N.C.

[21] Appl. No.: 08/811,651

[22] Filed: Mar. 5, 1997

[51] Int. Cl.$^6$ .................................. F16F 9/06; F16F 6/00
[52] U.S. Cl. .................................. 188/267.1; 267/140.14
[58] Field of Search .................. 267/140.14, 140.15; 188/267, 267.1, 267.2

[56] References Cited

U.S. PATENT DOCUMENTS

| | | | |
|---|---|---|---|
| 943,774 | 12/1909 | Ewart . | |
| 2,604,198 | 7/1952 | Stephenson | 192/21.5 |
| 2,667,237 | 1/1954 | Rabinow | 188/88 |
| 4,200,003 | 4/1980 | Miller | 74/574 |
| 4,336,707 | 6/1982 | Yamaguchi et al. | 73/35 |
| 4,717,874 | 1/1988 | Ichikawa et al. | 324/208 |
| 4,856,631 | 8/1989 | Okamoto et al. | 192/21.5 |
| 5,009,450 | 4/1991 | Herberg et al. | 188/267 |
| 5,018,606 | 5/1991 | Carlson | 188/267.1 |
| 5,238,232 | 8/1993 | Kobayashi et al. | 267/140.14 |
| 5,259,487 | 11/1993 | Petek | 188/267 |
| 5,263,558 | 11/1993 | Yamaoka | 188/267 |
| 5,277,281 | 1/1994 | Carlson et al. | 188/267 |
| 5,284,330 | 2/1994 | Carlson et al. | 267/140.14 |
| 5,293,969 | 3/1994 | Yamaoka et al. | 188/299 |
| 5,303,802 | 4/1994 | Kuwahara | 188/158 |
| 5,353,897 | 10/1994 | Woessner | 188/267 |
| 5,398,917 | 3/1995 | Carlson et al. | 267/140.14 |
| 5,440,183 | 8/1995 | Denne | 310/12 |
| 5,460,585 | 10/1995 | Gentry et al. | 482/1 |
| 5,492,312 | 2/1996 | Carlson | 267/140.14 |
| 5,547,049 | 8/1996 | Weiss et al. | 188/267 |
| 5,598,904 | 2/1997 | Spyche, Jr. | 188/287 |
| 5,598,908 | 2/1997 | York et al. | 192/21.5 |
| 5,632,361 | 5/1997 | Wulff et al. | 188/267 |

FOREIGN PATENT DOCUMENTS

| | | | |
|---|---|---|---|
| 44 33 056 A1 | 3/1996 | Germany | F16F 9/14 |
| WO 94/10692 | 5/1994 | WIPO | H01F 1/28 |
| WO 94/10693 | 5/1994 | WIPO | H01F 1/28 |
| WO 94/10694 | 5/1994 | WIPO | H01F 1/28 |
| WO 98/00653 | 1/1998 | WIPO . | |

OTHER PUBLICATIONS

U.S. application No. 08/674,371, Carlson et al., filed Jul. 2, 1996.

U.S. application No. 08/674,179, Carlson et al., filed Jul. 2, 1996.

U.S. application No. 08/613,704, Carlson, filed Mar. 11, 1996.

U.S. application No. 08/304,005, Carlson et al., filed Sep. 9, 1994.

*Primary Examiner*—Chris Schwartz
*Attorney, Agent, or Firm*—Randall S. Wayland

[57] ABSTRACT

A magnetorheological fluid device which exhibits excursion (stroke or rotation) dependent resistance (force or torque) which is obtained passively. Linear and rotary embodiments are described. The devices described herein include various ways for passively varying magnetic circuit reluctance to accomplish the stroke or rotation dependent characteristic. The devices include a first component with an internal cavity, a second component received in the cavity and moveable relative to the first component, a working zone created between the first and second component, a magnetorheological fluid contained therein, at least one permanent magnet for producing a magnetic field, a magnetic circuit for directing a magnetic flux created by the permanent magnet toward the magnetorheological fluid in the working zone, and passively varying a magnetic circuit reluctance (such as by changing a thickness of a magnetic return, by changing a gap thickness, by changing the material reluctance, by interacting multiple magnetic fields, or combinations thereof) as a function of excursion. This changes the magnetic field strength acting upon the MR fluid in the working zone and produces a force/torque which varies as a function of excursion (x or θ).

21 Claims, 9 Drawing Sheets

PASSIVE MAGNETORHEOLOGICAL FLUID DEVICE WITH EXCURSION DEPENDENT CHARACTERISTIC

FIELD OF THE INVENTION

This invention relates to the area of controllable fluid devices. Specifically, it relates to such devices employing a magnetically controllable fluid.

BACKGROUND OF THE INVENTION

Dampers and shock absorbers are known devices which use a hydraulic fluid as the working medium to create damping forces to control or minimize shock and/or vibration. One class of these devices are known as Magnetorheological (MR) fluid devices. MR devices may be of the "rotary-acting" or "linear-acting" variety. Known MR devices include linear dampers, rotary brakes, and rotary clutches. Each MR device employs a Magnetorheological (MR) fluid comprised of soft-magnetic particles dispersed within a liquid carrier. Typical particles include carbonyl iron, and the like, having various shapes, but which are preferably spherical and which exhibit mean dimensions of between about 0.1 $\mu$m to about 500 $\mu$m. The carrier fluids include low viscosity hydraulic oils, and the like. In operation, these MR fluids exhibit a thickening-like behavior (a rheology change) upon being exposed to a magnetic field. The higher the magnetic flux strength exposed to the fluid, the higher the damping/restraining force or torque that can be achieved within the MR device. Descriptions of prior art MR fluids can be found in WO 94/10694, WO 94/10693, and WO 94/10692 the inventions of which are commonly assigned to the assignee of the present invention.

Prior art MR fluid devices can be found in U.S. application Ser. No. 08/304,005 entitled "Magnetorheological Fluid Devices And Process Of Controlling Force In Exercise Equipment Utilizing Same", U.S. Ser. No. 08/613,704 entitled "Portable Controllable Fluid Rehabilitation Devices", U.S. Ser. No. 08/674,371 entitled" Controllable Brake", U.S. Ser. No. 08/674,179 entitled "Controllable Vibration Apparatus" and U.S. Pat. Nos. 5,547,049, 5,492,312, 5,398,917, 5,284,330, and 5,277,281, all of which are commonly assigned to the assignee of the present invention.

Notably, these MR devices can provide variable control forces or torques, as the case may be, but involve the complexities and cost associated with the required controllers and electromagnetic coils. These complex components may be cost prohibitive in some applications. Therefore, there is a long felt, and unmet, need for a simple and cost effective controllable MR fluid device for providing variability in force and/or torque which varies as a function of position or rotation.

SUMMARY OF THE INVENTION

In light of the advantages and drawbacks of the prior art, the present invention is a passive Magnetorheological (MR) fluid device which exhibits an output characteristic which varies as a function of excursion (linear or rotary), and which are obtained entirely passively. This eliminates the need for a controller and coil needed to obtain (through current variations) these excursion dependent characteristics in the prior art. The means for achieving output characteristics which vary as a function of excursion is accomplished by varying the magnetic reluctance of the circuit as a function of excursion. As will be described herein, the means for varying reluctance as a function of excursion comprises: 1) varying a thickness of a gap as a function of excursion, or 2) varying a thickness of a magnetic return as a function of excursion, or 3) changing the reluctance through providing interacting magnetic fields, or 4) varying the material in the magnetic circuit as a function of excursion.

In particular, the present invention is a magnetorheological fluid device which comprises a first component having an internal cavity, a second component received within the internal cavity and moveable relative to the first component through an excursion, a working zone created between the first component and the second component, a magnetorheological fluid contained within the internal cavity and the working zone, at least one permanent magnet for producing a magnetic flux supported by the first component or the second component, a magnetic circuit for directing said magnetic flux created by the at least one permanent magnet through the magnetorheological fluid contained within the working zone, means for passively varying a reluctance of the magnetic circuit as a function of said excursion thereby resultantly changing a flux density of the magnetic flux acting upon said magnetorheological fluid contained within the working zone and passively producing a force or torque which varies as a function of the excursion, where the excursion is a translation or a rotation depending upon whether the device is linear-acting or rotary-acting, respectively.

It is an advantage of one aspect of the present invention MR device that variable (stroke dependent) force profiles can be obtained without the coils and controllers required by prior art controllable linear MR devices to accomplish the same.

It is an advantage of the linear and rotary MR devices of the present invention that the force or torque profiles can be adjusted externally without the need for disassembly of the piston, rotors, or chambers within the MR device.

It is an advantage of another aspect of the present invention MR device that variable (rotational position dependent) torque profiles can be obtained without the coils and controllers required by prior art controllable rotary MR devices to accomplish the same.

The abovementioned and further features, advantages, and characteristics of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings, FIG. 12c illustrates a partial cross-sectioned side view of another MR reprogrammed damper where the magnetic permeability of the material in the magnetic return varies as a function of excursion and FIG. 12b illustrates an expected force profile therefor, FIG. 13a illustrates a cross-sectioned top view of a rotary-acting MR device which includes a variable thickness magnetic return, FIG. 13b illustrates a top view of the same rotary acting MR device with the rotor in a different position, FIG. 13c illustrates a cross-sectioned side view of a rotary-acting MR device of FIG. 13a, FIG. 13d illustrates a cross-sectioned top view of another embodiment of rotary-acting MR device which includes a variable gap thickness, FIG. 13e illustrates an expected torque profile for the device of either FIG. 13a or FIG. 13d.

DETAILED DESCRIPTION OF THE PREFERRED EMBODIMENTS

Figure 1A:
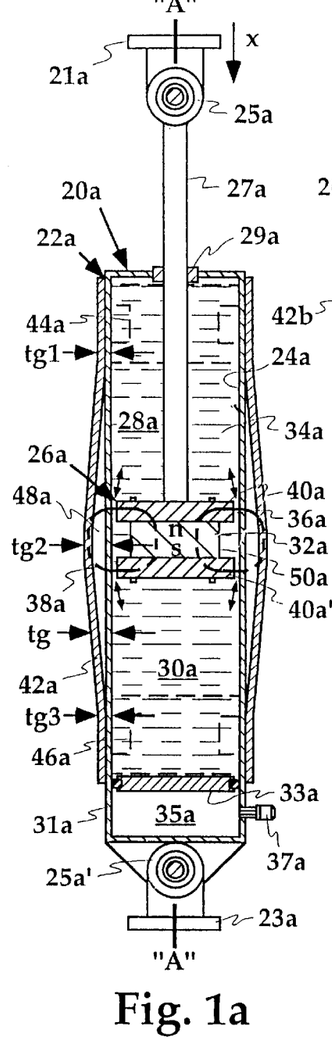
FIG. 1a illustrates a partial cross-sectioned side view of a MR linear device of the present invention which includes a variable gap and FIG. 1b illustrates the expected force profile therefor.

Referring now to the Drawings where like numerals denote like elements, in FIG. 1a, shown generally at 20a, is a first embodiment of the present invention passive MR device. This MR device 20a includes passively-obtained and excursion-dependent force characteristics. Such devices are hereinafter referred to as being "preprogrammed." The preprogrammed MR device 20a shown is of the linear-acting variety (a shock absorber, damper, or the like) and provides forces along its central axis "A"—"A". The preprogrammed MR device 20a is adapted for attachment to, and for producing variable forces between, two relatively moving first and second members 21a and 23a.

The MR device 20a is comprised of a first component, such as a housing 22a, which has an internal cavity 24a, and a second component such as a piston 26a which is moveable through an excursion x relative to the first component and is slidably received along an axis "A"—"A" within said internal cavity 24a. The piston 26a subdivides the internal cavity 24a into a first chamber 28a and a second chamber 30a. Preferably, the piston 26a includes several wear portions (See FIG. 12e) which contact the inner diameter of the housing 22a. These protruding wear portions position the piston 26a within the internal cavity 24a thereby forming the gap through which the magnetorheological fluid 34a flows forming one or more passageways 36a. The one or more passageways 36a interconnect the first chamber 28a and second chamber 30a and allow fluid communication therebetween. A magnetorheological fluid 34a is contained within said first chamber 28a, said second chamber 30a, and said passageway 36a. The MR fluid 34a preferably comprises a mixture of the known carrier oils with about 20%–40% by volume of carbonyl iron disbursed therein. The carbonyl iron is preferably spherically shaped and preferably exhibits mean dimensions of between about 0.1 $\mu$m and 500 $\mu$m. The fluid 34a preferably also includes any of the known thixotropic and/or wear agents.

The MR device 20a further includes at least one permanent magnet 32a, such as the puck-shaped magnet shown, for producing a magnetic flux $\phi$. The at least one magnet 32a is supported by at least one element selected from a group consisting of the piston 26a and the housing 22a. A magnetic circuit 38a directs the magnetic flux $\phi$ created by the at least one permanent magnet 32a through the magnetorheological fluid 34a contained within the passageway 36a. The point of novelty of the invention described herein comprises "means for passively varying a reluctance" of the magnetic circuit 38a as a function of the linear excursion x thereby, resultantly, changing the flux strength of said magnetic flux φ acting upon said magnetorheological fluid 34a contained within said passageway 36a. This novel feature passively produces a force F which varies as a function of said linear excursion x of said MR device 20a. As will be described herein, the means for varying reluctance as a function of excursion comprises: 1) varying a thickness of a gap as a function of excursion, 2) varying a thickness of a magnetic return as a function of excursion, or 3) varying the magnetic permeability of the material in the magnetic circuit as a function of excursion.

In more detail, a piston rod 27a, which includes a rod end 25a secured thereto, is attached to the first member 21a by way of bolts, or other like fastening means. The piston 26a is attached and secured to the other end of piston rod 27a. An appropriate seal and bearing assembly 29a prevents escape of the MR fluid 34a and helps to align the rod 27a and piston 26a within the housing 22a. Rod end 25a' is attached to housing 22a at its other end and attaches the device 20a to the second member 23a. The rod end 25a' is also secured via bolts, or other fastening means. The piston 26a is preferably comprised of a permanent magnet 32a sandwiched between pole pieces 40a and 40a'. The permanent magnet 32a, generates the magnetic field, while the pole pieces 40a, 40a', which are included in the magnetic circuit 38a, help direct or focus the magnetic field. The pole pieces 40a, 40a' are manufactured from a suitable soft-magnetic material, such as steel, or the like, and direct the magnetic flux through the passageway 36a, otherwise referred to as the working zone, i.e., the somewhat constricted area where the MR fluid 34a is subjected to strong magnetic fields.

In this embodiment the housing 22a is comprised of a sleeve 31a, which is preferably nonmagnetic, and a magnetic return 42a which carries the returning magnetic circuit. The magnetic return 42a is also preferably manufactured from a soft-magnetic material, such as steel. A thickness tg of a gap 48a varies from a minimum gap tg1, when the piston 26a is located at the first end of the excursion 44a (denoted by dotted lines), to a maximum thickness tg2 at mid excursion 50a (at the piston position shown), and back to a minimum tg3 at the second end of the excursion 46a (denoted by dotted lines). The gap 48a is located between the radial contact surface of the piston 26a and the return 42a. Varying this gap 48a as a function of excursion x functions as the means for varying the "reluctance" of the magnetic circuit 38a as a function of excursion x. When the reluctance is varied as a function of linear excursion x, the force needed to move the piston 26a varies as a function of its position.

Figure 1B:
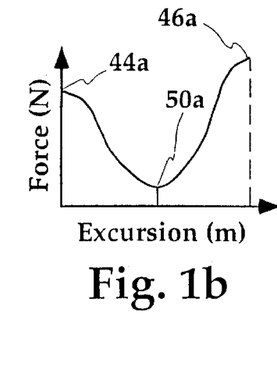

The principle involved comprises changing the "rheology" of the MR fluid 34a contained within the working portion of the passageway 36a (the working zone) when exposed to the magnetic field. When the field strength is decreased due to increasing the thickness of gap 48a along the excursion x, the resultant force generated is decreased or increased because the reluctance of the magnetic circuit 38a has changed. As the reluctance is increased, due to wider gap thickness tg, the resistance force drops off. Likewise, as the reluctance is reduced, by narrowing the gap, the force increases. By varying the thickness of the gap 48a, preferably in a smooth and uniform manner, from a minimum gap thickness tg at first end 44a, to a maximum thickness at mid excursion 50a, and back to a minimum thickness at second end 46a, a force profile as approximated by FIG. 1b can be arrived at, where a higher force is achieved at the excursion ends 44a, 46a thereby producing forces which may provide end-stop control. This end-stop control may be used to minimize bottoming out of the piston 26a of the device 20a. Although, it is preferred that sleeve 31a be nonmagnetic, a magnetic material may be used with similar results, albeit less variability in high and low force produced.

It should be understood that the force when the piston 26a is located at the second excursion end 46a is somewhat higher than when located at the first excursion end 44a because of the spring component added by use of the gas-type accumulator. In dampers, an accumulator is used to take up the displaced fluid due to movement of the piston rod 27a into the internal cavity 24a. The accumulator shown is comprised of a charge chamber 35a, a partition 33a, such as the axially-slideable puck and seal assembly shown, and a valve 37a for injecting the appropriate gas charge into the chamber 35a. Other types of accumulators could be used as well, as are known in the art. This spring component may be eliminated through the use of a double piston rod, as is described with reference to FIG. 12a.

Figure 2A:
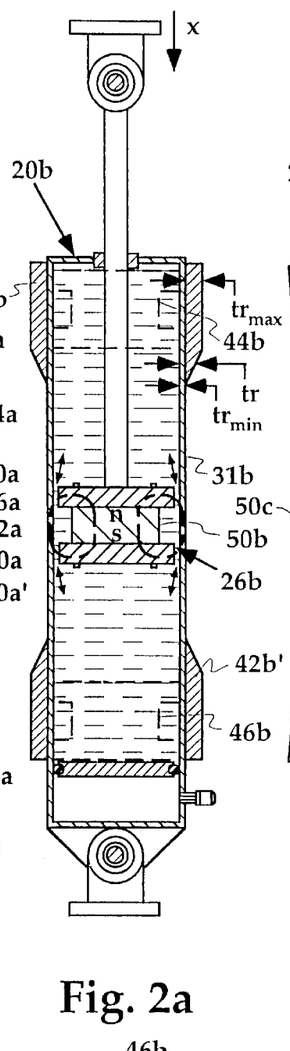
FIG. 2a illustrates a partial cross-sectioned side view of another embodiment of MR linear device which includes passive end stop control and FIG. 2b illustrates the expected force profile therefor.
Figure 2B:
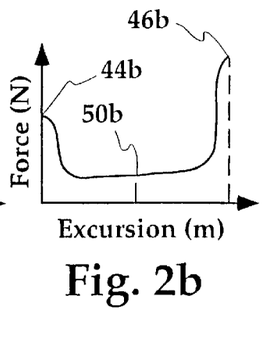

FIG. 2a illustrates an alternate embodiment of linear-acting MR fluid device 20b. In this embodiment, the variability in the reluctance of the magnetic circuit is achieved through a second means, i.e., varying the thickness tr of the at least one magnetic return 42b as a function of excursion x of the MR device 20b. The thickness of the magnetic returns 42b, 42b' vary from a maximum thickness trmax at the ends 44b, 46b to a minimum trmin at a point between the end excursions 44b, 46b and adjacent to the mid excursion 50b. The shape, taper, and/or thickness of the magnetic returns 42b, 42b' can be varied to appropriately shape the output force, as the piston 26b travels as a function of excursion x. The sleeve 31b is preferably made of a nonmagnetic material to achieve the lowest force possible at mid excursion 50b. An approximate force output profile is shown in FIG. 2b which may be achieved with the device 20b shown in FIG. 2a.

Figure 3A:
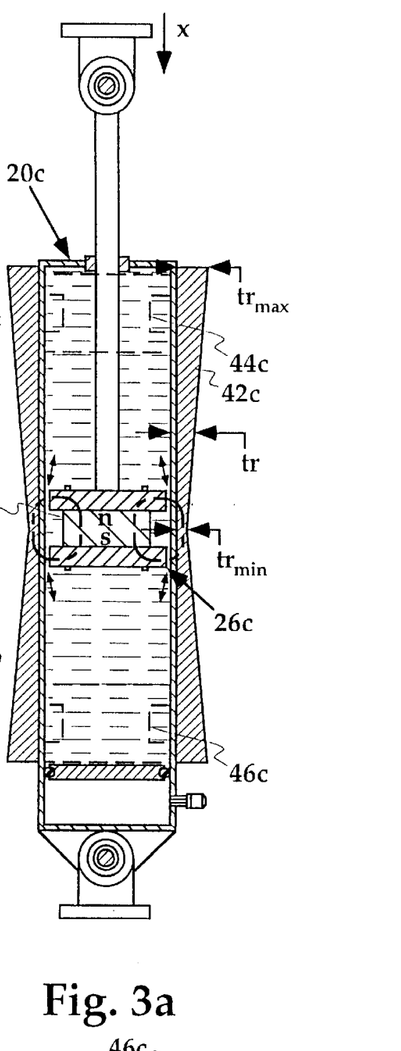
FIG. 3a illustrates a partial cross-sectioned side view of another embodiment of MR linear device which includes variable thickness of the magnetic return and FIG. 3b illustrates an expected force profile therefor.
Figure 3B:
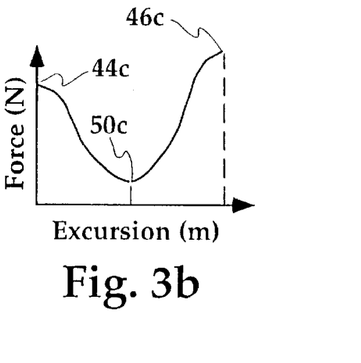

FIG. 3a illustrates another device 20c similar to FIG. 2a except that the magnetic return 42c is shaped to provide a thickness tr of said magnetic return 42c which is gradually tapered from a minimum thickness trmin adjacent to the mid excursion 50c, and back to a maximum thickness trmax at both of the first end 44c and a second end 46c of the linear excursion x. This provides increasing forces as the piston 26c approaches said ends 44c, 46c. FIG. 3b represents an estimate of a force profile that may be achieved with the device 20b shown in FIG. 3a. The corresponding change in annular cross sectional area of the magnetic return 42c as a function of excursion x results in changing levels of magnetic saturation in the magnetic return 42c. This, in turn, results in a changing magnetic circuit reluctance, and thus changing levels of magnetic field strength, which varies as a function of excursion x. This changing field strength provides the excursion-varying force output.

Figures 4A, 5A:
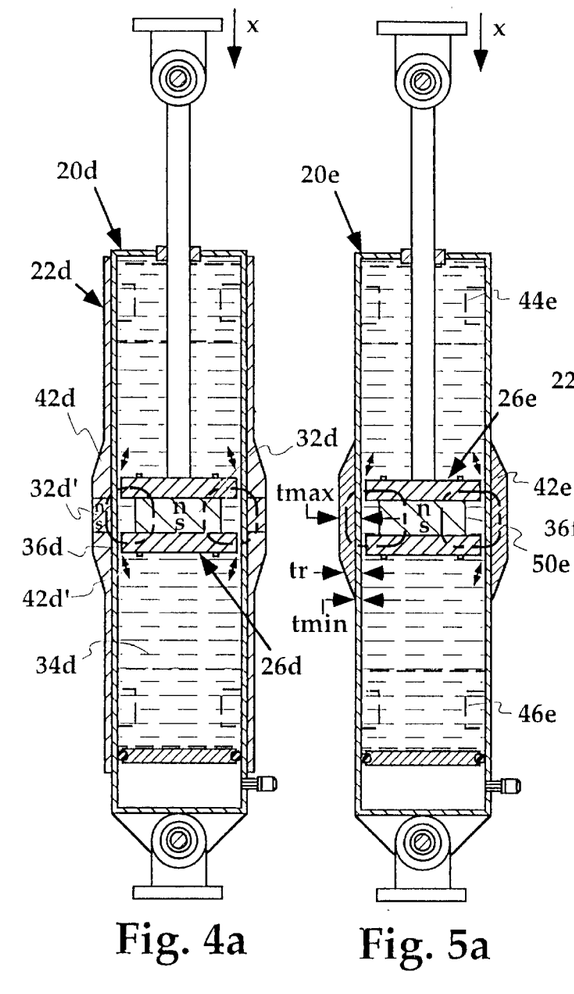
FIG. 4a illustrates a partial cross-sectioned side view of another embodiment of MR linear device which includes multiple interacting permanent magnets and FIG. 4b illustrates an expected force profile therefor.
FIG. 5a illustrates a partial cross-sectioned side view of another embodiment of MR linear device which includes higher force generation about midstroke and FIG. 5b illustrates an expected force profile therefor.
Figure 4B:
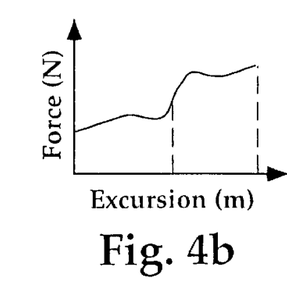

FIG. 4a comprises another linear-acting MR device 20d where the reluctance of the magnetic circuit is varied as a function of excursion x. In this embodiment, a first permanent magnet 32d is supported by the piston 26d and a second permanent magnet 32d' is supported by the housing 22d. Magnetic returns 42d, 42d' may also be varied in thickness as a function of excursion x. As the first permanent magnet 32d passes by the second permanent magnet 32d', the fields interact to vary the reluctance of the resultant magnetic circuit and thereby expose the MR fluid 34d contained in the passageway 36d to a magnetic field strength which varies as a function of excursion x. A curve approximated by FIG. 4b may be obtained by the device of FIG. 4a.

Figure 5B:
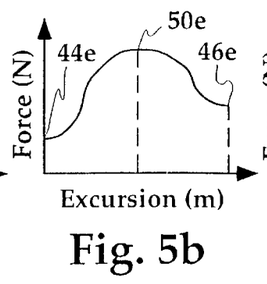

FIG. 5a illustrates another linear-acting MR device 20e similar to FIG. 3a except that the magnetic return 42e is shaped to provide a thickness tr of said magnetic return 42e which is at a maximum thickness trmax at mid excursion 50e, and at a minimum thickness trmin at the first end 44e and second end 46e of the linear excursion x. This provides decreasing forces as the piston 26e approaches the ends 44e, 46e. A curve approximated by FIG. 5b may be obtained by a device 20e such as shown in FIG. 5a.

Figure 6A:
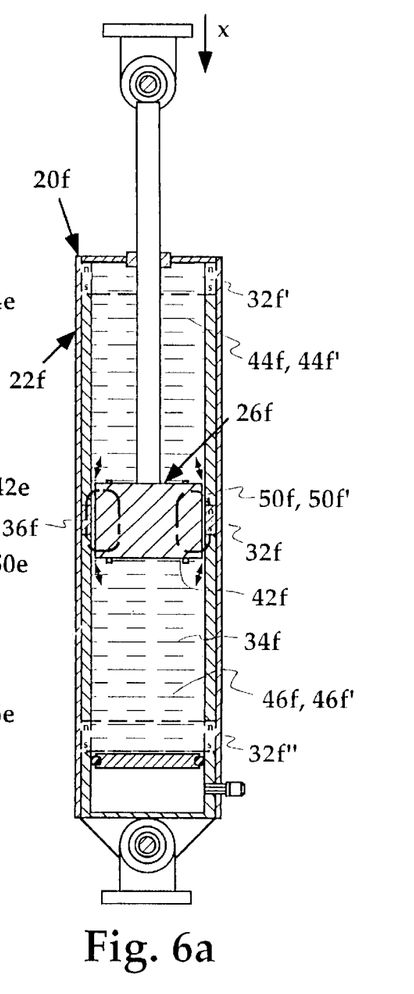
FIG. 6a illustrates a partial cross-sectioned side view of another embodiment of MR linear device which includes one or more permanent magnets including alternate locations) within the housing and FIG. 6b illustrates several expected force profiles therefor.
Figure 6B:
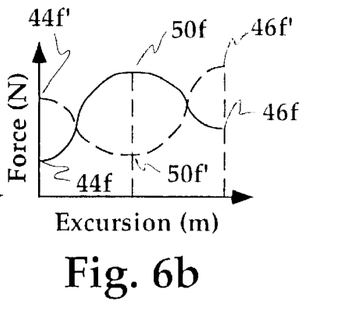

FIG. 6a comprises another linear-acting MR device 20f where the reluctance of the magnetic circuit is varied as a function of excursion x. In this embodiment, the permanent magnet 32f is supported by the housing 22f and the piston 26f functions as the magnetic return 42f. As the piston 26f passes the permanent magnet 32f, the reluctance of the resultant magnetic circuit changes and, thereby, exposes the MR fluid 34f contained in the passageway 36f to a magnetic flux that varies as a function of excursion x. A curve approximated by the solid line in FIG. 6b may be obtained by a device such as shown in FIG. 6a with a single magnet 32f at mid stroke 50f when stroked from first end 44f through midstroke 50f and to second end 46f. Alternatively, multiple ring-type magnets 32f', 32f" may be used at the ends 44f', 46f' and without a magnet at midstroke 50f' to achieve the approximated curve shown as dotted in FIG. 6b.

Figures 7A, 8A:
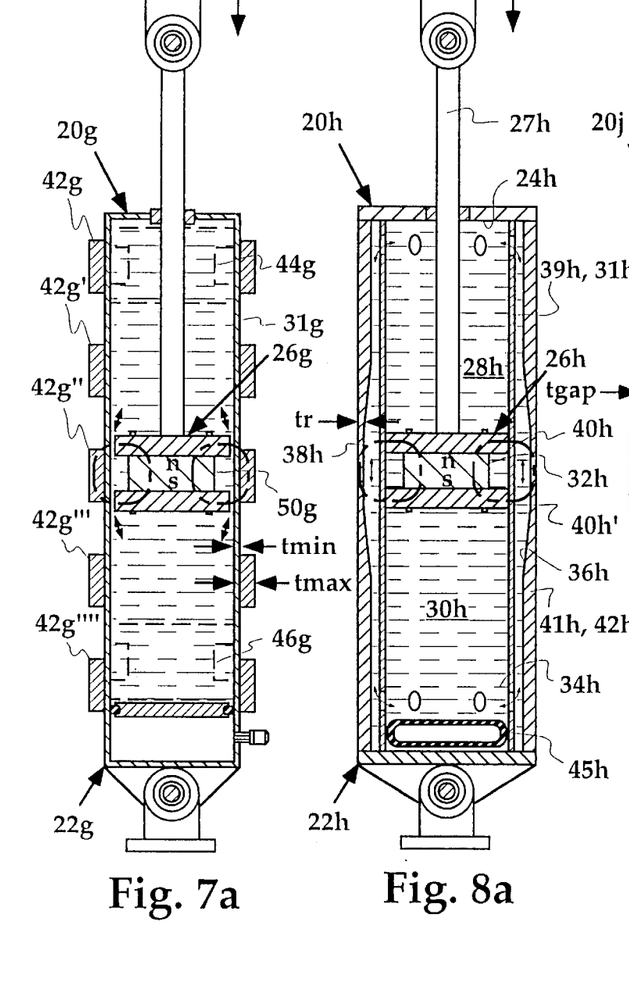
FIG. 7a illustrates a partial cross-sectioned side view of another embodiment of MR linear device which includes a plurality of magnetic returns about the housing and spaced along its length and FIG. 7b illustrates an expected force profile therefor.
FIG. 8a illustrates a partial cross-sectioned side view of a twin-tube embodiment of MR linear device which includes a variable thickness and gap and FIG. 8b illustrates an expected force profile therefor.

FIG. 7a comprises another linear-acting MR device 20g where the reluctance of the magnetic circuit is varied as a function of excursion x, preferably in a step-wise or periodic fashion. A plurality of magnetic returns 42g–42g"" are equally spaced along the length of sleeve 31g of the housing 22g, such that the thickness of the magnetic return alternates from a low thickness tmin to a higher thickness tmax several times along the excursion x. Therefore, as the piston 26g travels along the excursion, a ratchet-like effect is achieved, where the resistance force oscillates from a "high" force to a "low" force several times along the stroke between first end 44g and second end 46g. When the reluctance is low, such as when the piston 26g is at the position shown at mid excursion $^{50}$g, the restraining force is "high." However, when the piston 26g is located in between returns, such as between returns 42g' and 42g", the reluctance is high (because there is no magnetic return present in the magnetic circuit) and, therefore, a minimal or "low" restraining force is developed. Notably, it should be recognized that, alternatively, the spacing of returns 42g–42g"" need not be equal.

Figure 7B:
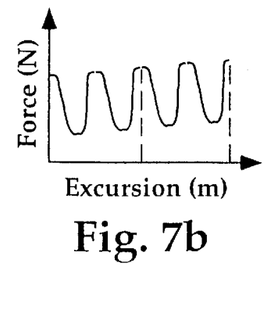

FIG. 7b illustrates an approximate force profile that may be developed by the device of FIG. 7a. Alternatively, the material used for the magnetic returns 42g–42g"" may be changed, for example, using a lower permeability material for some returns, and a higher permeability material for others, thereby, making individual spikes in the force v. excursion profile higher or lower depending upon the magnetic permeability of the material used. In this case, the means for varying the reluctance as a function of excursion x is provided by using different permeability materials in the various magnetic returns as a function of excursion x. Notably, this same means for providing reluctance variation may be applied in rotary-type devices.

Figure 8B:
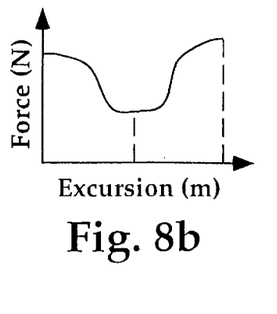

FIG. 8a comprises another linear-acting MR device 20h where the reluctance of the magnetic circuit is varied as a function of excursion x. This device 20h is a twin-tube-type damper, which includes a inner tube 39h (which is preferably a nonmagnetic sleeve 31h), and an outer tube 41h which also functions as the magnetic return 42h. Movement of the piston 26h forces MR fluid 34h between the first chamber 28h and the second chamber 30h through passageway 36h. The magnetic field created by permanent magnet 32h is directed by pole pieces 40h, 40h' through the MR fluid 34h in the passageway 36h to change the "rheology" thereof. This restricts the flow of the MR fluid 34h contained in the passageway 36h and, thereby, creates a resistance to relative movement between the piston 26h and housing 22h. An accumulator 45h, such as the compliant air bag shown, allows for the compensation due to the entry of piston rod 27h into internal chamber 24h. Other known accumulator means may also be used. The means for varying the reluctance of the magnetic circuit 38h is comprised of varying the thickness tr of the outer tube 41h (functioning as the magnetic return 42h), while at the same time, varying the thickness of the gap between the return 42h and the piston 26h. A force profile approximated by FIG. 8b may be obtained from such a device.

Figure 9A:
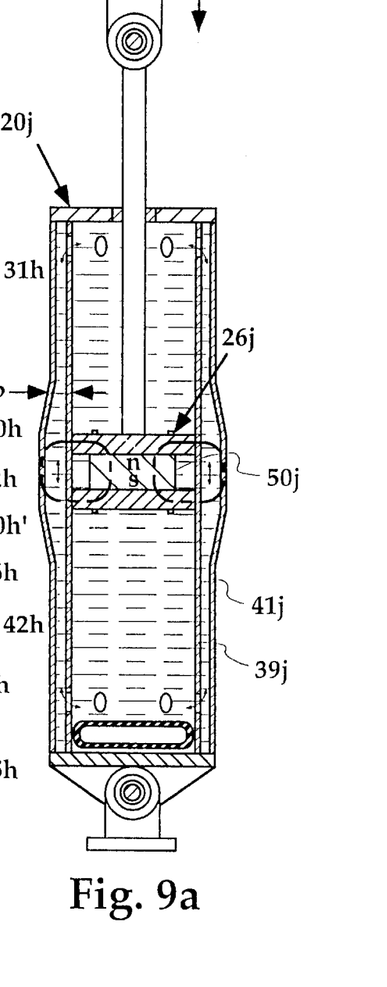
FIG. 9a illustrates a partial cross-sectioned side view of another twin-tube embodiment of MR linear device which includes a variable gap thickness and FIG. 9b illustrates an expected force profile therefor.
Figure 9B:
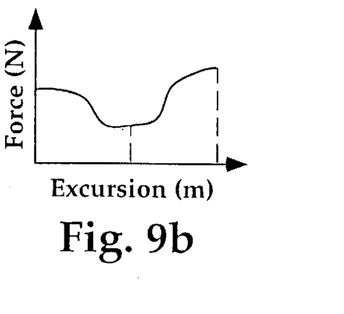

FIG. 9a comprises another twin-tube-type, linear-acting, MR device 20j where the reluctance of the magnetic circuit is varied as a function of excursion x. This device 20j is similar to the FIG. 8a embodiment except the means for varying the reluctance of the magnetic circuit is comprised of varying the gap thickness between the outer tube 41j and inner tube 39j. Therefore, when the reluctance is high, the force is low, as is true when the piston 26j is in the position shown. Contrarily, when the piston is at the ends, the forces produced are higher, as the reluctance is lower. This provides a damper device 20j which has a low damping level about midstroke 50j and higher damping at the ends of the stroke, thereby, enabling the damping out of any substantial motions, while improving isolation about mid excursion 50j. It should be appreciated, that the thickness of the return path only, as well, could be adjusted alone, to accomplish the same effect as adjusting the gap thickness tgap.

FIGS. 10a–12a comprise other embodiments of MR linear-acting devices 20k, 20m, 20n. In particular these devices are effective at controlling impact forces, i.e., they are impact-type absorbers. In The FIG. 10a embodiment, the reluctance of the magnetic circuit is passively variable by varying the thickness tr of the magnetic return 42k as a function of excursion x. As mentioned before, the corresponding change in annular cross-sectional area of the magnetic return 42k as a function of excursion x results in changing levels of magnetic saturation, and thus, magnetic field strength, in the magnetic return 42k. This, in turn, results in a force which also varies as a function of excursion x. For example, the thickness tr varies from a minimum thickness trmin adjacent to the first end 44k to a maximum thickness trmax at the second end 46k of excursion. Therefore, many force profiles are obtainable by sculpting the dimensional details of the magnetic return 42k. In particular, an impact force profile estimate, such as shown in FIG. 10b may be obtainable, such as when a first moving member 21k impacts with end 25k, the impact is absorbed by providing more and more restriction to flow of the MR fluid 34k through the passageway 36k as the piston 26k travels downward along the excursion x. Therefore, the impact force to second member 23k is minimized. Further, the variable force profile is obtained entirely passively.

Figure 10A:
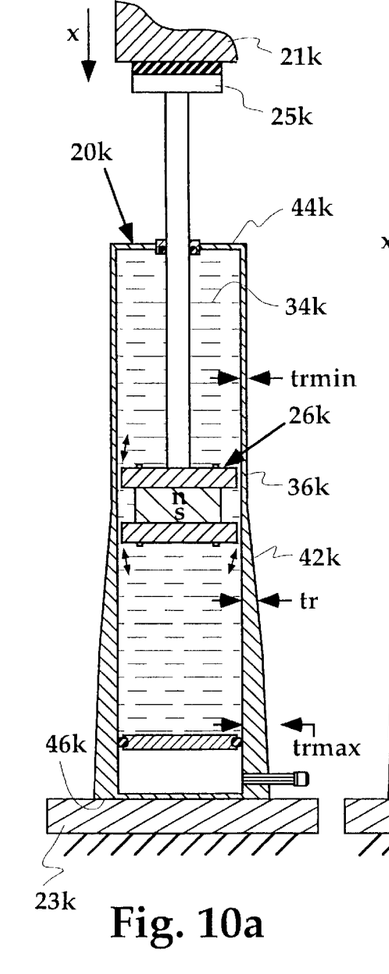
FIG. 10a illustrates a partial cross-sectioned side view of an impact absorber embodiment of MR linear device which includes a variable thickness magnetic return and FIG. 10b illustrates an expected force profile therefor.
Figure 10B:
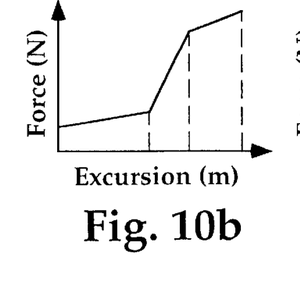
Figures 11A, 12A:
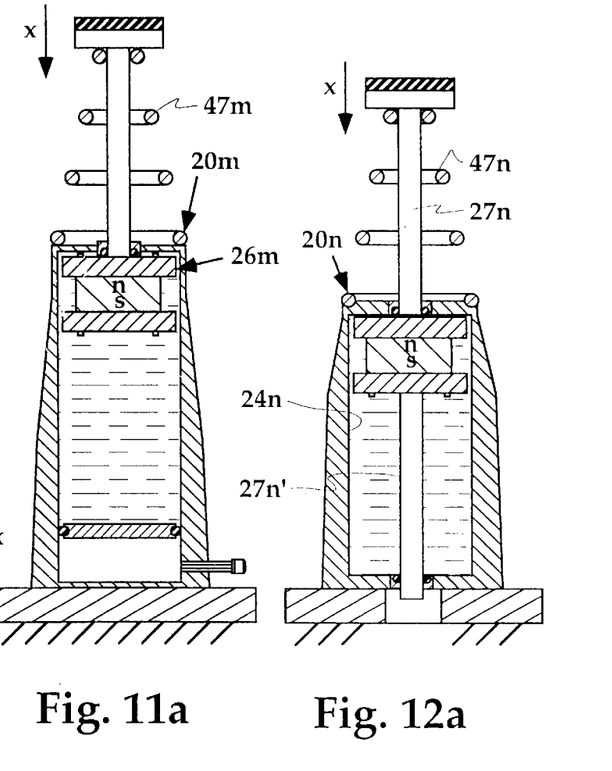
FIG. 11a illustrates a partial cross-sectioned side view of another impact absorber embodiment which includes a variable thickness magnetic return and a coil spring and FIG. 11b illustrates an expected force profile therefor.
FIG. 12a illustrates a partial cross-sectioned side view of another impact absorber embodiment which includes a variable thickness magnetic return, a coil spring, and multiple piston rods
Figure 11B:
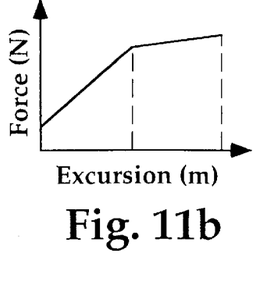
Figure 12B:
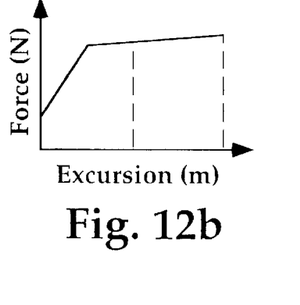
FIG. 12b illustrates an expected force profile therefor.

FIG. 11a and FIG. 12a describe alternate embodiments as compared to the FIG. 10a impact absorber embodiment. FIG. 11a describes a device 20m which includes a conical-type return spring 47m for returning the piston 26m to its initial position. FIG. 12a illustrates both a return spring 47n and dual piston rods 27n, 27n'. The use of dual piston rods 27n, 27n' eliminates the need for a expansion chamber/accumulator, as in the previous two embodiments. This is because there is no change in volume of the elements within the internal cavity 24n. Approximate force profiles are given by FIG. 11b and FIG. 12b for the embodiments of FIG. 11a and 12a, respectfully.

Figures 12C, 12D, 12E:
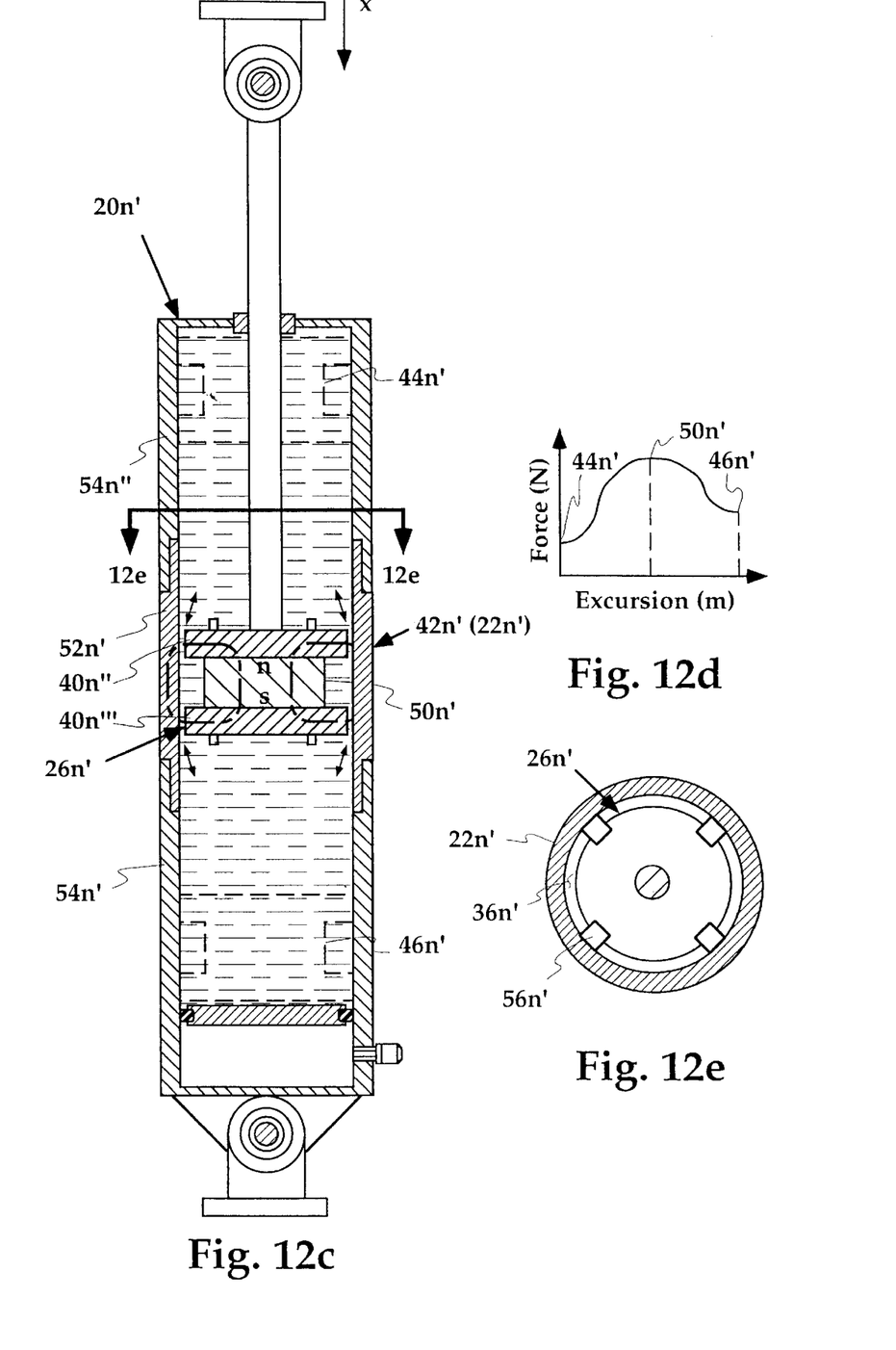

FIG. 12c illustrates another linear-acting MR device 20n' where the means for passively varying the magnetic reluctance as a function of linear excursion x comprises changing the magnetic permeability of the magnetic return as along the excursion x. This provides changing forces as the piston 26n' approaches the ends 44n', 46n'. For example, center section 52n' may be manufactured from a high magnetic permeability material, such as low carbon steel, and end sections 54n', 54n" may be manufactured from a lower permeability material, such as stainless steel. Sections 52n', 54n', 54n" may be joined by welding or press fit. A curve approximated by FIG. 12d may be obtained by a device 20n' such as shown in FIG. 12c.

FIG. 12d illustrates a piston 26n' in the linear-acting MR device 20n'. The piston 26n' includes pole pieces 40n", 40n''' which direct the magnetic flux across the passageway 36n'. Preferably, a plurality of nonmagnetic wear strips 56n' radially spaced about the periphery of pole pieces 40n", 40n''' center the piston 26n' relative to the housing 22n' and maintain the design gap in passageway 36n'.

Figures 13A, 13B, 13C, 13D, 13E:
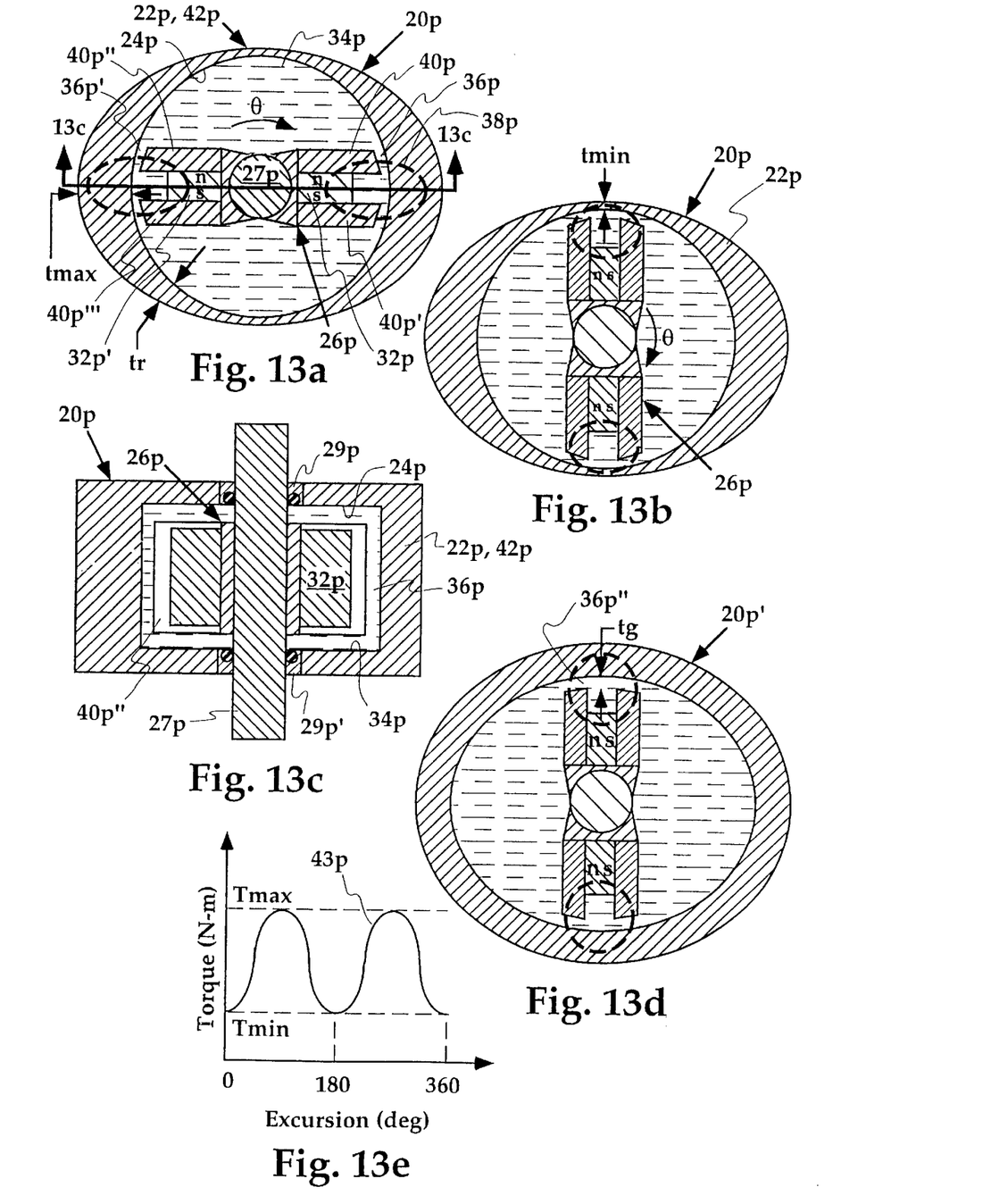

FIG. 13a through FIG. 13c illustrate a rotary-acting embodiment of the MR device 20p of the present invention. The rotary acting MR device 20p comprises a housing 22p having an internal cavity 24p formed therein. Preferably, the internal cavity 24p has a circular periphery and is of sufficient depth to receive a rotor 26p therein. The rotor 26p is rotatable through a rotational excursion θ relative to the housing 22p via allowing shaft 27p to rotate within the seal and bearing assemblies 29p, 29p'. The rotor 26p is preferably comprised of pole pieces 40p, 40p' and at least one permanent magnet 32p. The pole pieces 40p, 40p' and at least one permanent magnet 32p are secured, via appropriate means, to shaft 27p and are rotatable therewith. The pole pieces 40p, 40p' direct or focus the magnetic flux produced by magnet 32p toward a gap 36p formed between the rotor 26p and the housing 22p. By way of example, the gap 36p is on the order of about 0.010 inch (0.254 mm) wide. The line of flux shown is approximated by magnetic circuit 38p.

A magnetorheological fluid 34p is contained within the internal cavity 24p and also within gap 36p. Preferably, there are multiple pole pieces and magnet sets, such as a second set of pole pieces 40p" and 40p''' and a second magnet 32p' radially opposed from the first set. The magnet may be supported by the rotor as is shown here, or alternatively, supported by the housing, as will be illustrated in FIGS. 17a, and 18a. Means for passively varying the reluctance of the magnetic circuit 38p are provided. In particular, the variation in reluctance is provided by varying the thickness tr of the magnetic return 42p, which in this case, also comprises the housing 22p. In this way, the magnetic field strength varies as a function of rotary excursion θ, thereby, producing a per-cycle variation in the flux density B exposed to the MR fluid 34p in the gaps 36, 36p'. This produces a torque T which also varies as a function of the rotary excursion θ.

FIG. 13a illustrates a cross-sectioned top view of the MR rotary-acting device 20p with the rotor 26p aligned with the maximum thickness tmax of the housing 22p, thereby correlating with minimum reluctance and maximum torque produced. Contrarily, FIG. 13b illustrates the rotor 26p aligned with the minimum thickness tmin of the housing 22p thereby correlating with maximum reluctance and minimum torque produced. Alternatively, the means for passively varying the reluctance of the magnetic circuit may be maintaining a constant thickness of the housing and varying the thickness tg of the gap 36p", as shown in FIG. 13d. FIG. 13e illustrates an approximate curve 43p obtainable with the device of either FIG. 13a or FIG. 13d.

Figures 14A, 15A:
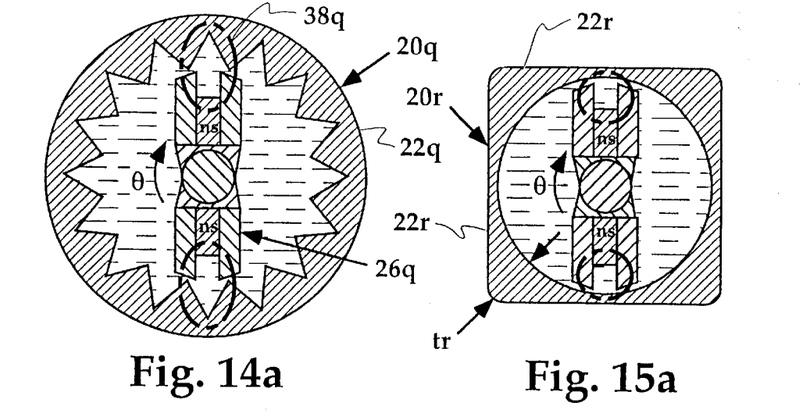
FIG. 14a illustrates a cross-sectioned top view of another rotary-acting MR device which includes a variable thickness magnetic return and variable gap thickness and FIG. 14b illustrates an expected torque profile therefor.
FIG. 15a illustrates a cross-sectioned top view of another rotary-acting MR device which includes a variable thickness magnetic return and FIG. 15b illustrates an expected torque profile therefor.
Figure 14B:
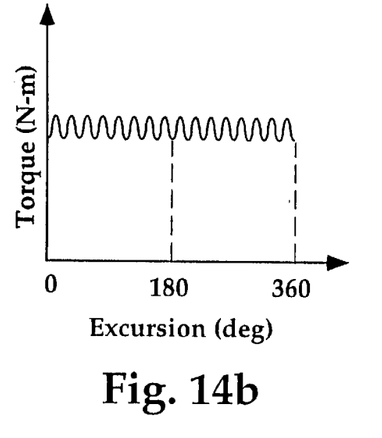
Figure 15B:
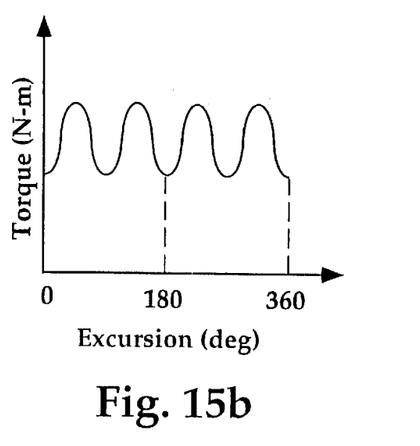
Figure 16A:
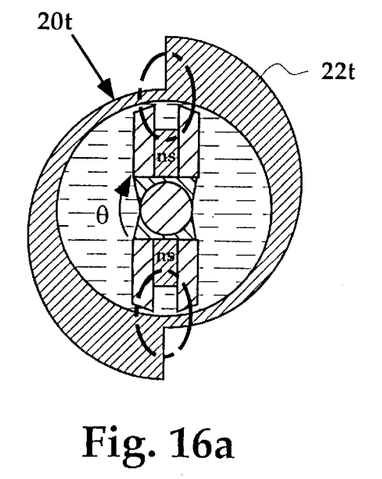
FIG. 16a illustrates a cross-sectioned top view of another rotary-acting MR device which includes a variable thickness magnetic return and FIG. 16b illustrates an expected torque profile therefor.
Figure 16B:
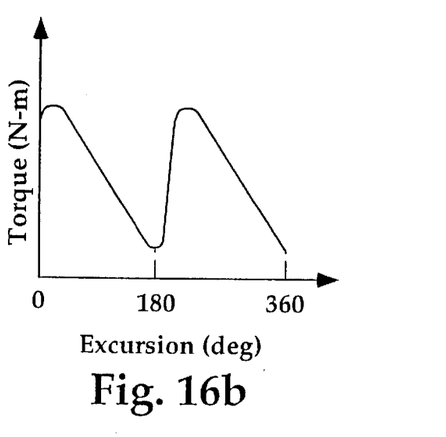

FIG. 14a, FIG. 15a, and FIG. 16a represent other embodiments of preprogrammed rotary-acting MR devices 20q, 20r, and 20t. In FIG. 14a embodiment, the thickness of the gap between the rotor 26q and the housing 22q and the thickness of the outer housing 22q are both varied, in combination, as a function of rotary excursion θ. This combination comprises the means for varying the reluctance of the magnetic circuit 38q. This provides a torque profile as shown estimated in FIG. 14b with multiple individual peaks within each rotational cycle, thereby providing a ratchet-like effect. It should be understood, that either the magnetic return thickness alone, or the gap thickness alone, may be varied, or both varied together as described herein. For example, in FIG. 15a, the radial thickness tr of the housing 22r alone, is varied as a function of rotational excursion θ, thereby providing an approximate force profile as shown in FIG. 15b. Likewise, in FIG. 16a, the thickness of the housing 22t is varied as a function of excursion θ in a linear fashion to provide a ramped-torque output with two cycles per rotation as approximated by FIG. 16b. Notably, any number of ramps per cycle may be implemented.

Figure 17A:
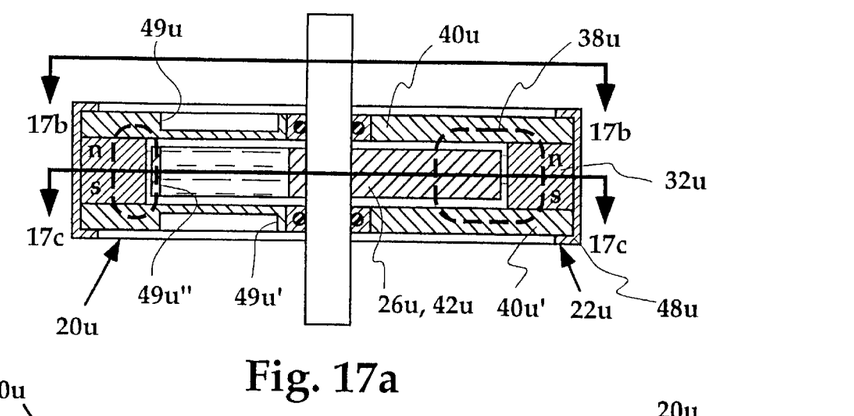
FIG. 17a illustrates a cross-sectioned top view of another rotary-acting MR device which includes means for providing a variable thickness magnetic return and FIG. 17d illustrates an expected torque profile therefor.
Figure 17B:
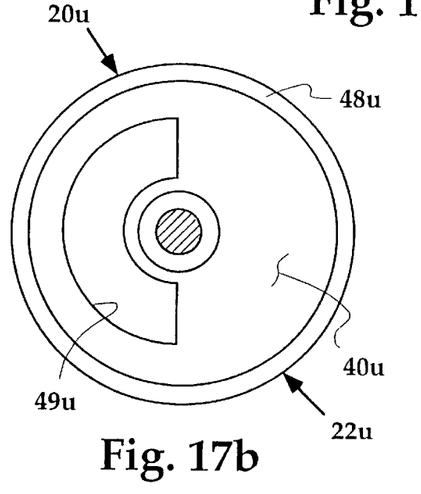
FIG. 17b and FIG. 17c illustrate a top view (FIG. 17b) and a cross-sectioned top view (FIG. 17c) of the rotary-acting MR device of FIG. 17a illustrates the cut out portions in the housing and rotor.
Figure 17C:
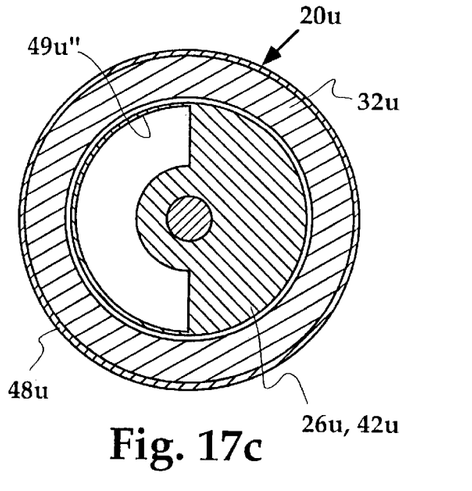
Figure 17D:
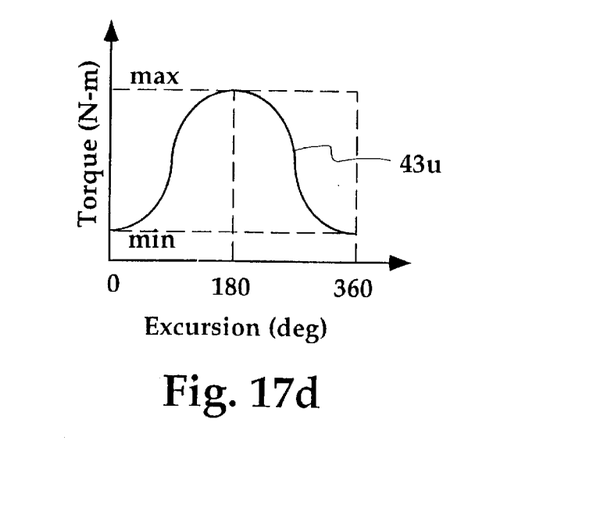

FIG. 17a, 17b, and 17c illustrate another embodiment of MR device 20u which includes a ring-type permanent magnet 32u which is supported relative to the outer housing 22u. The outer housing 22u is comprised of magnet 32u, pole pieces 40u, 40u' for directing the magnetic flux within magnetic circuit 38u, and preferably nonmagnetic ring 48u for retaining poles 40u, 40u' and magnet 32u in their places. At least one of the pole pieces 40u, 40u' includes a localized cutout, and preferably, both include cutouts 49u, 49u' on their axial faces. In this embodiment, the cutout is C-shaped, but any shape such as round, square, etc. will produce similar results. The rotor 26u comprises a disk-shaped member, and also includes a localized cutout 49u". Preferably, the shape of cutout 49u" in rotor 26u closely matches the shape of the cutouts 49u, 49u' in the pole piece(s) 40u, 40u'. The magnetic flux Φ in the areas where the cutouts 49u, 49u', 49u" align is significantly less than where the cutouts 49u, 49u', 49u41 are unaligned, thereby producing a torque profile, as approximated by FIG. 17d, which varies as a function of rotational excursion θ. Generally, it should be understood that the means for varying the reluctance of the magnetic circuit 38u comprises a combination of 1) varying the reluctance of the magnetic return 42u as a function of excursion θ, which in this embodiment, is the rotor 26u, and 2) varying the reluctance of the pole pieces 40u, 40u' as a function of excursion θ. Together, the thickness variations in the pole pieces 40u, 40u' and rotor 26u interact as a function of rotational excursion θ, such that the reluctance of the circuit 38u also varies as a function of rotary excursion θ. This produces the torque profile approximated by the curve 43u illustrated in FIG. 17d where the torque oscillates from a low (min) value to a high (max) value at least once per rotational excursion θ.

Figure 18A:
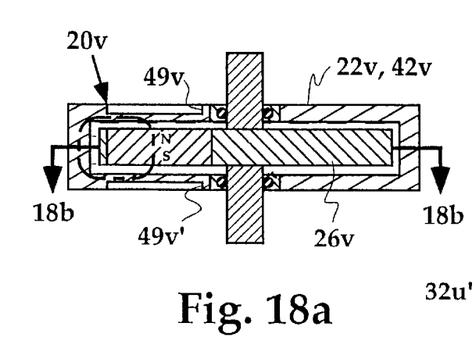
FIG. 18a and 18b illustrates a cross-sectioned side and top views, respectively, of another rotary-acting MR device which includes permanent magnets within the rotor and a variable thickness magnetic return
Figure 18B:
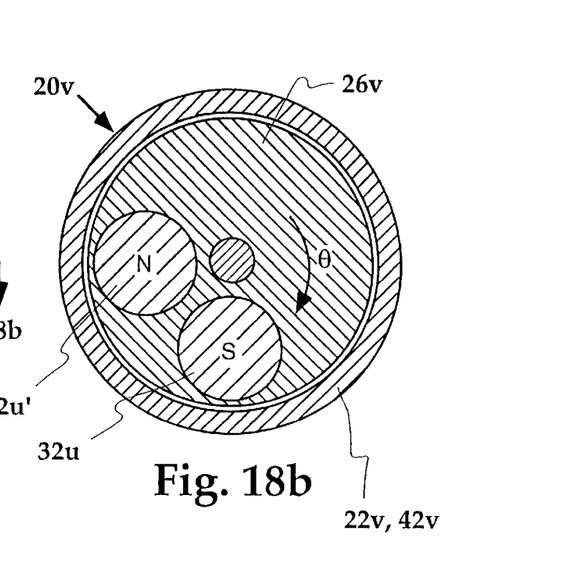
Figure 18C:
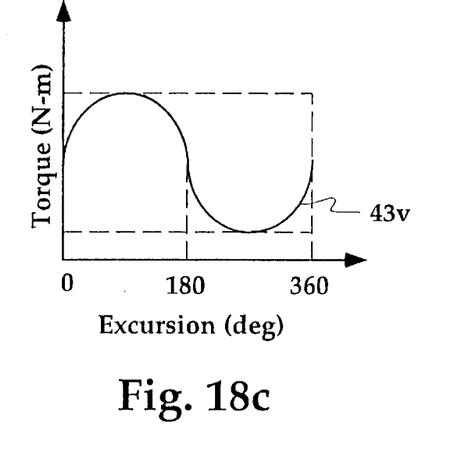
FIG. 18c illustrates an expected torque profile therefor.

FIG. 18a and 18b illustrate another embodiment of MR device 20v which preferably includes multiple and preferably disc-shaped permanent magnets 32u, 32u' which are supported relative to the rotor 26v. Alternatively, the magnets 32u, 32u' (or a single magnet) may be supported relative to the housing 22v, with the cutouts being formed into the rotor 26v. The thickness of the magnetic return 42v, which is also the outer member 22v, is varied as a function of rotational excursion θ, such that the torque varies as a function of excursion θ, as approximated by the curve 43v shown in FIG. 18c. The thickness variation is preferably obtained by forming cutouts 49v, 49v', via machining or the like, locally into the faces of housing 22v. Notably, this embodiment lacks any pole pieces for directing the magnetic field. However, the magnetic field is directed by the orientation of the magnets 32u, 32u', such that the magnet's north n and south s poles are substantially aligned with the axis of the MR device 20v. When the magnetic field is aligned with the cutouts, the reluctance is high and, resultantly, the torque produced is low. Likewise, when the magnets are rotated to be located adjacent to the thicker section of housing 22v, the reluctance is low and the torque produced is higher. Therefore, the torque varies as a function of rotational excursion θ. It should now be apparent, that all the aforementioned preprogrammed devices (linear-acting or rotary-acting) provide passively obtained force or torque variability as a function of excursion (either x or θ).

In summary, it should be apparent from the foregoing that the present invention comprises a novel preprogrammed MR device (either rotary or linear acting) which includes a first and second component, a working zone having MR fluid contained therein, a permanent magnet creating a magnetic field and generating a magnetic flux, and magnetic circuit means directing the magnetic flux to act upon the MR fluid within the working zone, and means for varying the reluctance of the magnetic circuit, thereby producing an output (force or torque) which varies as a function of excursion (x or θ).

While several embodiments including the preferred embodiment of the present invention have been described in detail, various modifications, alterations, changes, and adaptations to the aforementioned may be made without departing from the spirit and scope of the present invention defined in the appended claims. It is intended that all such modifications, alterations, and changes be considered part of the present invention.

We claim:

1. A linear magnetorheological fluid device, comprising:
   (a) a housing having an internal cavity,
   (b) a piston slidably received within said internal cavity and subdividing said internal cavity into a first chamber and second chamber, said piston moveable throughout a linear excursion,
   (c) a passageway interconnecting said first and second chambers,
   (d) a magnetorheological fluid contained within said first chamber, said second chamber, and said passageway,
   (e) at least one permanent magnet for producing a magnetic flux included within at least one of:
       (i) said piston, and
       (ii) said housing,
   (f) a magnetic circuit for directing said magnetic flux created by said at least one permanent magnet through said magnetorheological fluid contained within said passageway,
   (g) means for passively varying a reluctance of said magnetic circuit as a function of said linear excursion thereby resultantly changing a density of said magnetic flux acting upon said magnetorheological fluid contained within said passageway and, thereby, passively producing a force which varies as a function of said linear excursion of said device.

2. A device of claim 1 wherein said means for passively varying said reluctance further comprises a gap of varying thickness between a pole piece and a magnetic return within said magnetic circuit along said linear excursion.

3. A device of claim 1 wherein said means for passively varying said reluctance further comprises a magnetic return of varying thickness within said magnetic circuit along said linear excursion.

4. A device of claim 3 wherein said varying thickness of said magnetic return is greater adjacent a first end and a second end than at a mid excursion of said linear excursion thereby providing higher forces at said first and second ends.

5. A device of claim 3 wherein said thickness of said magnetic return is greater adjacent a mid excursion than at both of a first end and a second end of said linear excursion thereby providing higher forces at said mid excursion than at said ends.

6. A device of claim 3 wherein said thickness of said magnetic return is gradually tapered from a minimum thickness at a mid excursion to a maximum thickness at both of a first end and a second end of said linear excursion thereby providing increasing forces as said piston approaches said ends.

7. A device of claim 3 wherein said thickness of said magnetic return is gradually tapered from a minimum thickness adjacent to a first end to a maximum thickness adjacent to a second end of said linear excursion thereby providing increasing forces as said piston approaches said second end.

8. A device of claim 3 wherein said thickness of said magnetic return alternates from a low thickness to a high thickness multiple times along said linear excursion thereby providing an oscillating force along said excursion.

9. A device of claim 1 wherein said means for passively varying a reluctance of said magnetic circuit as a function of said linear excursion comprises at least one stationarily mounted permanent magnet adjacent said housing such that when said piston passes by said at least one stationarily mounted permanent magnet this causes a change in said reluctance of said magnetic circuit thereby varying force as a function of excursion.

10. A device of claim 9 wherein said at least one stationarily mounted permanent magnet is located adjacent a mid excursion thereby causing a change in said force thereat.

11. A device of claim 9 wherein said at least one stationarily mounted permanent magnet further comprises:
    (a) a first magnet located adjacent a first end, and
    (b) a second magnet adjacent a second end of said linear excursion thereby causing an change in said force at said ends.

12. A device of claim 9 further including said at least one stationarily mounted permanent magnet located within said piston.

13. A device of claim 1 selected from a group consisting of:
    (a) a single tube damper,
    (b) a twin tube damper, and
    (c) an impact damper.

14. A device of claim 1 wherein said means for passively varying said reluctance further comprises varying a magnetic permeability of a material within a magnetic return in said magnetic circuit means along said linear excursion.

15. A rotary magnetorheological fluid device, comprising:
    (a) a housing having an internal cavity,
    (b) a rotor received within said internal cavity and rotatable relative to said housing through a rotational excursion,
    (c) a gap formed between said housing and said rotor,
    (d) magnetorheological fluid contained within said internal cavity and said gap,
    (e) at least one permanent magnet for producing a magnetic flux included within one selected from a group consisting of:

(i) said rotor, and
(ii) said housing,
(f) a magnetic circuit for directing said magnetic flux created by said at least one permanent magnet toward said magnetorheological fluid contained within said gap,
(g) means for passively varying a reluctance of said magnetic circuit as a function of said rotational excursion thereby resultantly changing a flux density of said magnetic flux acting upon said magnetorheological fluid contained within said gap and passively producing a torque which varies as a function of said rotational excursion of said device.

16. A device of claim 15 wherein said means for passively varying a reluctance is accomplished by varying a gap thickness between a pole piece and a magnetic return within said magnetic circuit along said rotational excursion.

17. A device of claim 15 wherein said means for passively varying a reluctance is accomplished by varying a thickness along said rotational excursion of a magnetic return contained within said magnetic circuit.

18. A device of claim 15 said means for passively varying a reluctance is accomplished by both:
   (a) varying a thickness of a magnetic return along said rotational excursion, and
   (b) varying a gap between a pole piece and said magnetic return.

19. A device of claim 15 wherein said torque varies in one fashion elected from a group consisting of:
   (a) a substantially sinusoid fashion, and
   (b) a substantially ramped fashion.

20. A device of claim 15 wherein said torque varies from a high value to a low value at least once per said rotational excursion.

21. A magnetorheological fluid device, comprising:
   (a) a first component having an internal cavity,
   (b) a second component received within said internal cavity and moveable relative to said first component through an excursion,
   (c) a working zone created between said first component and said second component,
   (d) a magnetorheological fluid contained within said internal cavity and said working zone,
   (e) at least one permanent magnet for producing a magnetic flux included within one selected from a group consisting of:
      (i) said first component, and
      (ii) said second component,
   (f) a magnetic circuit for directing said magnetic flux created by said at least one permanent magnet toward said magnetorheological fluid contained within said working zone,
   (g) means for passively varying a reluctance of said magnetic circuit as a function of said excursion thereby resultantly changing a flux density of said magnetic flux acting upon said magnetorheological fluid contained within said working zone and passively producing one selected from a group consisting of:
      (i) a force, and
      (ii) a torque which varies as a function of said excursion.

* * * * *